US012673829B2

(12) United States Patent
Trad

(10) Patent No.: US 12,673,829 B2
(45) Date of Patent: Jul. 7, 2026

(54) CONVEYOR LINEAR DRIVE FOR CONTINUOUS BULK MATERIAL CONVEYING DEVICE

(71) Applicant: Haka Groups Participacoes De Negocios S/A, Belo Horizonte (BR)

(72) Inventor: Frederico Trad, Lima (BR)

(73) Assignee: Haka Groups Participacoes De Negocios S/A, Belo Horizonte (BR)

( * ) Notice: Subject to any disclaimer, the term of this patent is extended or adjusted under 35 U.S.C. 154(b) by 61 days.

(21) Appl. No.: 18/704,525

(22) PCT Filed: Oct. 17, 2022

(86) PCT No.: PCT/BR2022/050399
§ 371 (c)(1),
(2) Date: Apr. 25, 2024

(87) PCT Pub. No.: WO2023/070183
PCT Pub. Date: May 4, 2023

(65) Prior Publication Data
US 2024/0409319 A1 Dec. 12, 2024

(30) Foreign Application Priority Data
Oct. 27, 2021 (BR) .......................... 1020210215623

(51) Int. Cl.
*B65G 23/23* (2006.01)

(52) U.S. Cl.
CPC ................................... *B65G 23/23* (2013.01)

(58) Field of Classification Search
CPC ............................... B65G 23/23; B65G 54/02
See application file for complete search history.

(56) References Cited

U.S. PATENT DOCUMENTS 3,788,447 A * 1/1974 Stephanoff ............. B65G 23/23
198/852
11,198,568 B2 * 12/2021 Ragan .................... B65G 43/08
(Continued)

FOREIGN PATENT DOCUMENTS

EP 1714923 A2 * 10/2006 ............. B65G 54/02
EP 2485916 B1 * 12/2015 ............... B60L 7/00
(Continued)

*Primary Examiner* — Gene O Crawford
*Assistant Examiner* — Abby A Jorgensen
(74) *Attorney, Agent, or Firm* — Defillo & Associates, Inc; Evelyn A. Defillo

(57) ABSTRACT

A double-face linear motor with a short primary and a segmented secondary for use in belt conveyors where rotary motors are predominantly used. The primary remains fixed and static, firmly connected to the conveyor structure and the secondary follows the belt that moves in a closed loop in a vertical plane around return drums. This motor improves the efficiency of conventional conveyor belts using rotary electric motor units in their head drums. The method includes electromagnetically moving by induction the secondary blades made of a conducting material as they pass between the active faces of the motor primary where multiphase coils are arranged. The secondary blades are fastened to the belt and moves the belt by electromagnetic forces generated in the primary. The long-segmented secondary makes a distributed linear drive because the segments formed by the blades adapt to the loop path formed by the return drum of the belts.

1 Claim, 4 Drawing Sheets

(56)                    References Cited

U.S. PATENT DOCUMENTS

| | | | |
|---|---|---|---|
| 2022/0302814 A1 * | 9/2022 | Mignano ................ | H02K 16/04 |
| 2023/0026825 A1 * | 1/2023 | Kirkland ................ | B64U 50/19 |

FOREIGN PATENT DOCUMENTS

| | | | | | |
|---|---|---|---|---|---|
| GB | 1442127 | A | * | 7/1976 | ............ B65G 15/40 |
| JP | 09183518 | A | * | 7/1997 | |
| JP | 2004043132 | A | * | 2/2004 | |
| WO | WO2021058800 | | | 4/2021 | |
| WO | WO-2021058800 | A1 | * | 4/2021 | ............ H02K 16/04 |
| WO | WO-2024175556 | A1 | * | 8/2024 | ............ B65G 21/22 |

* cited by examiner

A–A

CONVEYOR LINEAR DRIVE FOR CONTINUOUS BULK MATERIAL CONVEYING DEVICE

CROSS REFERENCE TO RELATED APPLICATION

This application is a National Stage Entry of PCT/BR2022/050399 filed Oct. 17, 2022, under the International Convention and claiming priority over Brazil Patent Application No. 1020210215623 filed Oct. 27, 2021.

FIELD OF THE INVENTION

This invention belongs to the field of electrical engineering with applications in transportation engineering. It involves the use of a linear induction motor with an active double-faced primary and a new geometry of the linear motor secondary to enable the use of this type of motor in linear movement that performs a closed-loop motion.

PRIOR ART

Linear transport equipment, such as conventional belt conveyors, uses rotary motors located at the head of the conveyor belt, coupled to the drum drive shaft of the conveyor. This configuration results in a series of inefficiencies in the transport system, such as the use of tensioners to generate mechanical tension in the belt and generate enough friction on the drive drum to prevent slippage during conveyor operation.

Such an increase in load causes friction, wear, increased energy consumption, and other inconveniences for machinery operation.

The proposed solution involves the use of linear motors distributed along the conveyor belt to maintain constant traction over the entire length of the belt and, thus, reduce the need for conventional tensioners.

Another issue presented by traditional belt conveyors with rotary motors in aggressive environments is the entry of contaminants through the motor shaft, leading to the deterioration of both bearings and the electrical components of the motor.

The proposed invention is more resistant to dust and debris since the linear motor can be considered an open motor with a larger iron distance and protected against contaminants through resin impregnation. This reduces or eliminates the problem of motor failure due to particle and water infiltration.

Traditional linear conveyors driven by a rotary motor at their head have another inconvenience: only one operating direction since flexible conveyors must operate by traction on the drive drum and not by compression, which would cause deformation in the conveyor and not movement. This fact imposes an operating direction on these devices without the possibility of reversing the operating direction without a physical modification in the equipment, such as installing another motor set at the other end of the conveyor, in its return drum. This makes conveyors that operate in two directions have 2 motor sets, and one of these sets is idle during the operation of the other.

With linear drive through linear motors distributed along the conveyor, this problem is eliminated, and the conveyor belt can operate in both directions without leaving any motor idle in both directions. This is possible because each unit can be controlled individually and together, forming a driving wave in the desired direction with the involvement of all linear motors, preventing deformation of the conveyor belt and resulting in a greater operational advantage.

Linear motors are electric motors that have the same components as rotary electric motors, but they perform linear movement relative to the parts.

The secondary of a linear motor corresponds to the rotor of a conventional induction rotary motor, and the primary of the linear motor is where the windings and the iron core are located.

Linear motors are generally low-power motors and have advantages in the direct application of linear movement without the need to convert rotary motion.

The linear motor of this invention has a modification in its secondary element that allows its application in linear movement in a loop, such as that performed by linear conveyors. They can be implemented in flexible belt conveyors with rubber canvas, vertical or horizontal conveyors, and also in short or long-haul conveyors due to their linear distribution and the versatility of installation of these motors, which were designed to be installed in the intervals between rollers of these types of conveyors.

The secondary presented has the characteristic of not being a continuous element but is divided into several blades forming a train of plates. This proposed train can still be in two forms:

The first is plates of approximately rectangular shape with some overlap between them, allowing the accommodation in the plate train in the return drum (FIG. 5) of the equipment to be pulled, such as a conveyor belt.

The second is trapezoidal plates with their larger base to be fixed on the conveyor belt and the smaller base pointing to the inner part of the loop. This configuration also allows the accommodation of the train in the return drums of the linear conveyor (FIG. 6).

The proposed invention is designed to operate in aggressive environments such as the mining environment where dust, liquids, and debris may be present. For this, the motor has a series of protection items that allow its safe operation in this type of environment.

DESCRIPTION OF THE PRIOR ART

The developed invention sought technical subsidies in other works disclosed in articles and other patents, finding no similarity in these publications.

Thus, the necessary requirements were developed to allow the full use of this motor with a modified secondary in equipment that currently uses conventional rotary motorization in its operation.

The motors described as prior art have clear differences in the type of primary and secondary, with the vast majority of the found publications being of the synchronous motor type, step motors, or secondaries with the use of permanent magnets, which disqualifies any competition with the proposed invention.

Prior Art

1982|HPGK: Linear Motor [PI8103086]: "The invention relates to a linear motor comprising an armature and a stator, each adapted to provide a sequence of North and South poles along the length of the motor. The pole spacing of the stator magnets is different from that of the armature coils, so that, with proper excitation of said coils, this difference in pole spacing and stator can result in a net thrust of the armature relative to the stator in a convenient direction at any location within a range of relative longitudinal positions of the armature and stator." This motor does not compete with the proposed invention as it is characterized by the use of permanent magnets in the stator, therefore being another type of equipment.

1983|FIPAI: Linear Step Motor [PI 8105580-3 A2]: "The present invention relates to a toothed core of soft ferromagnetic material, with smaller or larger spacing in relation to the arrangement of the various surrounding cores along the core, also made of soft ferromagnetic material and excited each by electrical coils. With the progressive excitation of the coils, a stepped magnetic field is formed that acts on the teeth of the core, linearly displacing it due to the phase shift of the teeth of the core with the U-shaped core." This patent deals with a step linear motor applied to motion control problems. It differs, therefore, in the type of motor and its application.

1998|LG: Magnetic Assembly for Linear Motor—[PI 9605555-3]: "This is a magnetic assembly for a linear motor, which is capable of facilitating assembly and increasing reliability by fixing magnets to a cylindrical magnetic housing to form a magnetic assembly, and which includes a magnetic housing and a plurality of magnets fixed to a peripheral surface of the magnetic housing." This patent is characterized by a linear motor with permanent magnets in the secondary and mounted on a cylindrical housing, therefore being another type of linear motor.

2006|Klessmann Holzbearbeitungssysteme GmbH: Workpiece transport device with at least one endlessly circulating chain—[DE102005019036A1]: "In such a transport device, guide devices are provided in the orbit of the chain to which an upper wire of the chains supporting the rail for the rollers of the chain links can be attached. In order to drive the chain as vibration-free as possible, a linear drive corresponding to an electromagnetic linear motor is provided, including the relatively movable primary and secondary parts of the linear drive are arranged in the orbit of the chain and in the chain links." This patent uses a synchronous motor with permanent magnet secondary, which constitutes another type of linear motor and, therefore, different from the innovation proposed in this document.

2010|KKT: Linear Motor—[PI 0923573-6]: "The linear motor is configured by the inclusion of a line of external permanent magnets, arranged by the disposition of arched permanent magnets to be adjacent to each other in a way that the magnetic poles of the permanent magnets are rotated by a maximum of 90° in relation to the other permanent magnets, in a cross-sectional view including central axes of the permanent magnets, a magnetic field including a line of internal permanent magnets, having magnetization vectors whose radial directional components are directed in the same directions as those of the line of external permanent magnets, and whose axial directional components are directed in directions opposite to those of the line of external permanent magnets, an armature including a molded three-phase coil as a ring, which is supported between the line of external permanent magnets and the line of internal permanent magnets, so as to be movable in an axial direction of the ring, and an excitation device, which causes the armature to generate a predetermined torque. In this way, strong magnetic fluxes can be linked with an armature coil without the use of an iron core, and the magnetic fluxes of the magnetic field are linked with the entire armature coil." This patent is characterized by a tubular linear motor with arched permanent magnets. Designed to work as a generator as well. It should be strongly characterized as an actuator and, therefore, differs from the linear drive proposed for conveyor belts.

2011|Gillette: Linear Motor and Method of Operation Thereof—[PI 0620835-5]: "The present invention relates to the apparatus and associated systems or methods that include a linear machine with an elongated and axially sliding core element (i.e., a shaft). In one embodiment, the shaft includes at least one radial opening to provide communication of a fluid (e.g., air) between an internal volume of a winding tube containing one or more stationary windings, and each end of the shaft, through a lumen extending axially throughout the length of the shaft. The stationary windings are spaced to allow fluid flow through a plurality of radial openings present in the winding tube. In particular, the circulation of fluid through the windings can provide sufficient cooling to increase the maximum current rating of the machine. Fluid circulation can also provide pneumatic processing capabilities (e.g., vacuum immobilization, blow-off). In an exemplary embodiment, the apparatus can be used to insert tube-and-square type paper separators into battery casings at high speeds." This patent is characterized by a tubular motor composed of a stationary winding and a secondary core consisting of permanent magnets. A system that can axially accelerate a mandrel to operate on a workpiece, track a workpiece, and position the mandrel to operate on it, apply a vacuum pressure to openings in the mandrel to hold at least one object to be manipulated, and quickly reverse the vacuum to a positive pressure to release said object at a predetermined point in the motion profile. Thus, configuring another type of equipment.

2012|JASTRZEMBSKI JAN PETER: Drive of a conveyor by a linear motor—[DE102011016039A1]: "The method involves turning an endless conveyor belt or an endless conveyor chain of a conveyor belt around deflection devices. The belt or chain is electromagnetically driven by a linear motor in association with soft magnetic secondary parts. The motor is arranged in a stator and between the upper and lower stretches, and the coils (3) of a multi-phase fed system are provided with a two-sided construction piece. The construction part is connected to the secondary parts on the belt to generate force in the feeding direction while preventing normal forces. An independent claim is also included for a belt conveyor comprising linear motors." This patent differs from the proposed invention by the type of motor used (synchronous motor) with ferromagnetic secondary parts, while in the present solution, the secondary plates are made of electrically conductive materials such as aluminum and copper. Thus, configuring another type of equipment.

2015 KKYD: Linear Motor Armature, Linear Motor, and Armature Manufacturing Method—[BR 10 2013 005643-0 A2]: "An armature of a linear motor. The armature includes an armature core with a plurality of teeth arranged linearly and spaced at predetermined intervals and a plurality of coils fitted in adjacent teeth, each of the coils having flange portions, wherein a winding is wound around the coil to form a spiral. At least one of the flange portions of the coil is formed with a first protrusion and a second protrusion. An overlapping section is formed by the first and second protrusions of two adjacent coils that come into contact with or overlap each other." This patent is characterized by a synchronous Linear Motor with an unconventional methodology for winding the coils in the slots of the primary. The secondary is made of permanent magnets. This patent relates to a completely different linear motor manufacturing method than the motor revealed in this document.

2015|LG: Linear Motor Stator Structure—PI 0105269-1: "The present invention relates to a stator structure of a linear motor, and more particularly, to the stator structure of a linear motor, which is capable of reducing the number of parts and simplifying the assembly structure." This patent is characterized by an assembly of a synchronous linear motor primary. In the stator structure of a linear motor, a coil is wound around a bobbin; a plurality of unitary stacked core elements of a predetermined thickness, each of which is formed by stacking a plurality of laminations formed from thin sheets in a predetermined shape, and radially positioned on the outer circumference of the coil. Consequently, it is possible to reduce the number of parts forming the stator and to simplify the stator structure. Therefore, it is possible to reduce the time to assemble the parts and the processes of assembling the parts, thus improving assembly productivity. Thus, the object of this patent does not compete with the linear drive of conveyor belts revealed in this document.

1974|PT Components Inc: Linear motor conveyor—[U.S. Pat. No. 3,788,447A]: "A conveyor using a linear motor has an endless guide support in which the stators of the linear motors are housed. The conveyor segments are hinged in an endless loop for articulating movement, both horizontally and vertically, or both, along the endless path defined by the guide support. The conveyor segments, having an armature portion extending through slots in the guide support, are retained in the guide support in all orientations of the conveyor by laterally extending parts, including a load support part. The conveyor is driven along the guide track by electromagnetic coupling of the stators of the linear motor with the armature portions of the conveyor segment loop." This patent is characterized by a linear conveyor with articulated secondary for vertical and horizontal curves, such secondary plates differ from the current invention both in geometric shape and in attachment to the traveling belt. In this publication, the secondary blade has flat horizontal branches that function as the volume conveyor, while in the proposed invention, the secondary plates are independent of the belt and must be attached to it. Another difference to be noted is that in the described publication, the secondary plates are fixed to each other, constituting a train of links with restrictions on elongation. In the proposed invention, the secondary blade plates are not fixed to each other, allowing elongation of the conveyor belt, which is attached. This differentiation is very important not to restrict the degree of freedom of elongation of the rubber belt conveyor.

2011|Siemens: Conveyor system comprising an electro-magnetic brake—[WO2011042487A2]: "The invention relates to a transport system comprising a transport device that can be moved along a substantially vertical path and a linear motor comprising a primary part, arranged in said transport device, and a secondary part arranged along the travel path. The primary part has a primary winding and at least one permanent magnet, and the secondary part has a profile in the direction of the travel path, comprising grooves and teeth alternately arranged. In order to increase opera-tional safety, a brake winding is arranged in the secondary part so that it can generate a braking force interacting with the permanent magnet, to brake said transport device." This patent is characterized by a transportation system for vertical movements, driven by a linear motor, comprising a primary part consisting of a winding and a magnet, and a secondary part arranged along the path with grooves and teeth. It also includes a brake. It differs by using magnets to complete the magnetic circuit.

BRIEF DESCRIPTION OF THE FIGURES

The entire system can be better understood through the following detailed description, in accordance with the attached figures, where:

6

Figure 1:
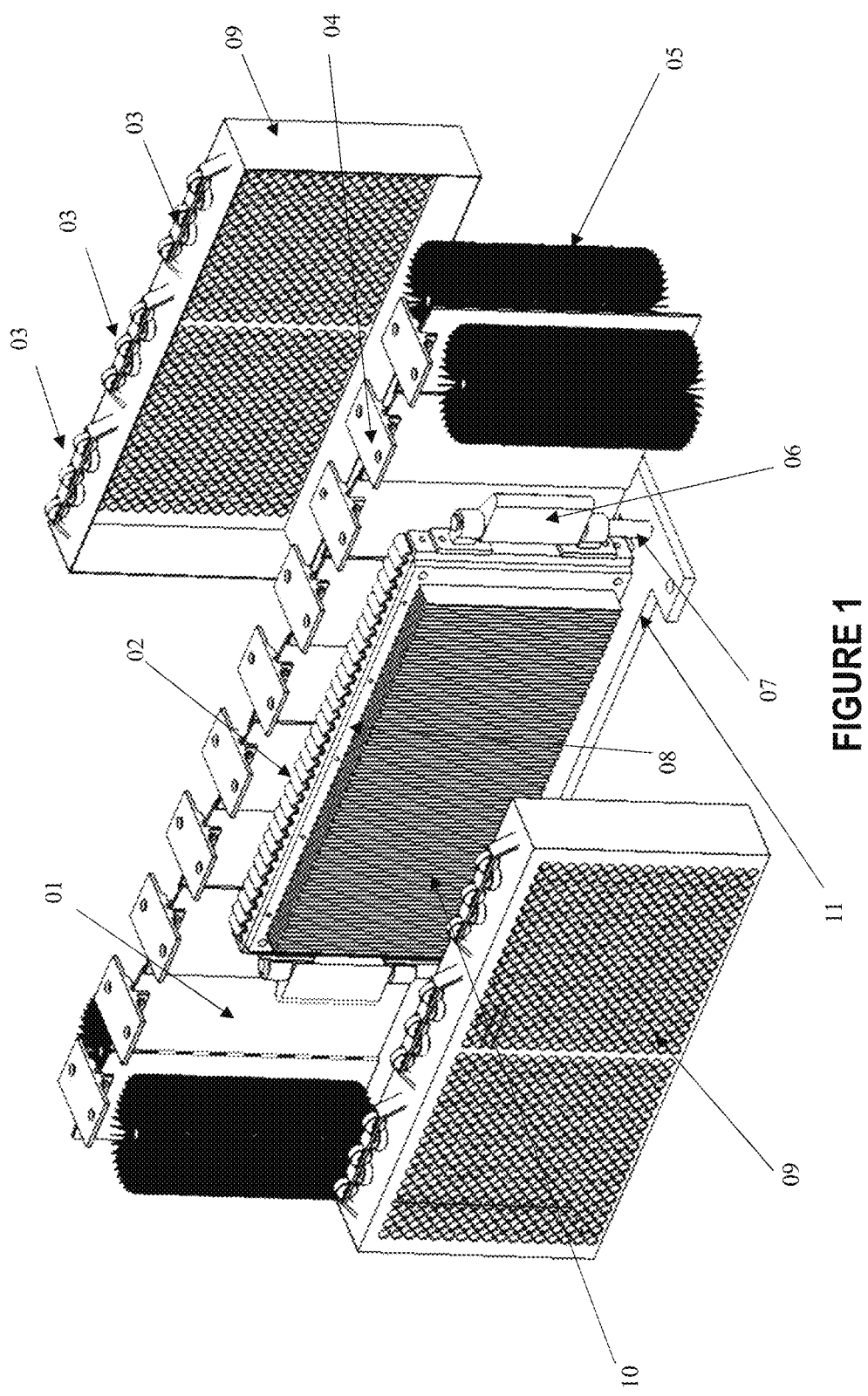
Figures 2, 3:
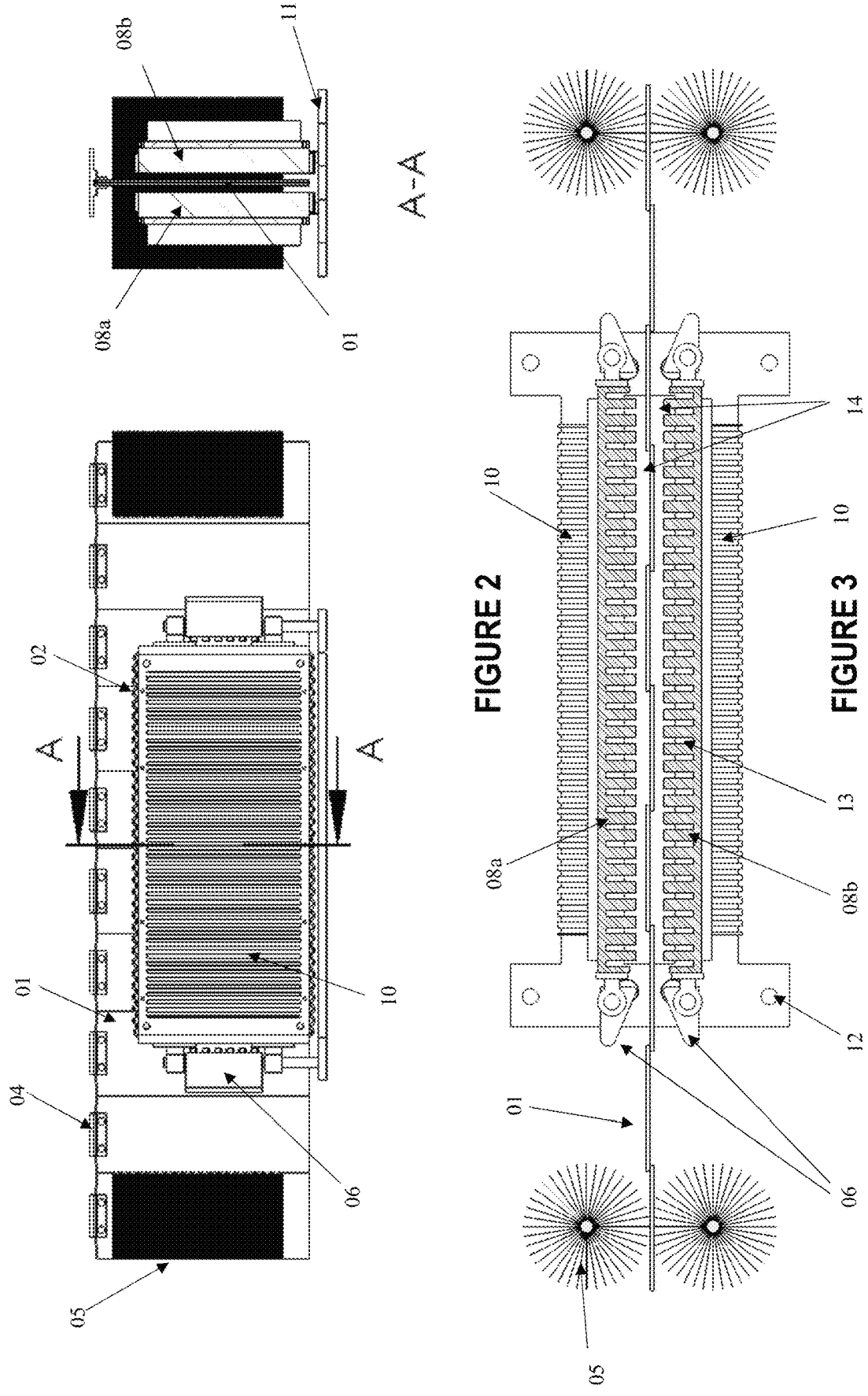
Figure 4:
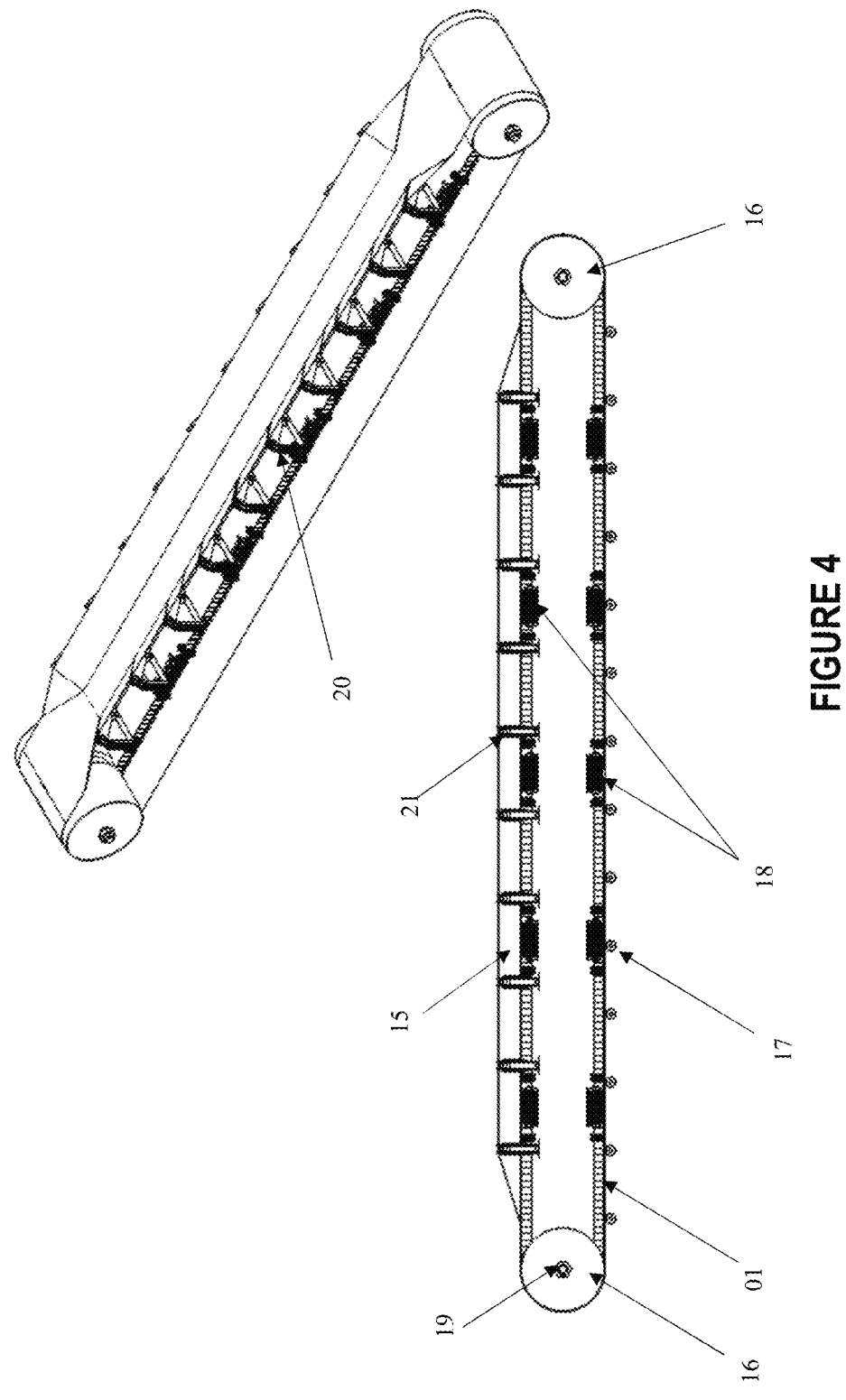
Figures 5, 6:
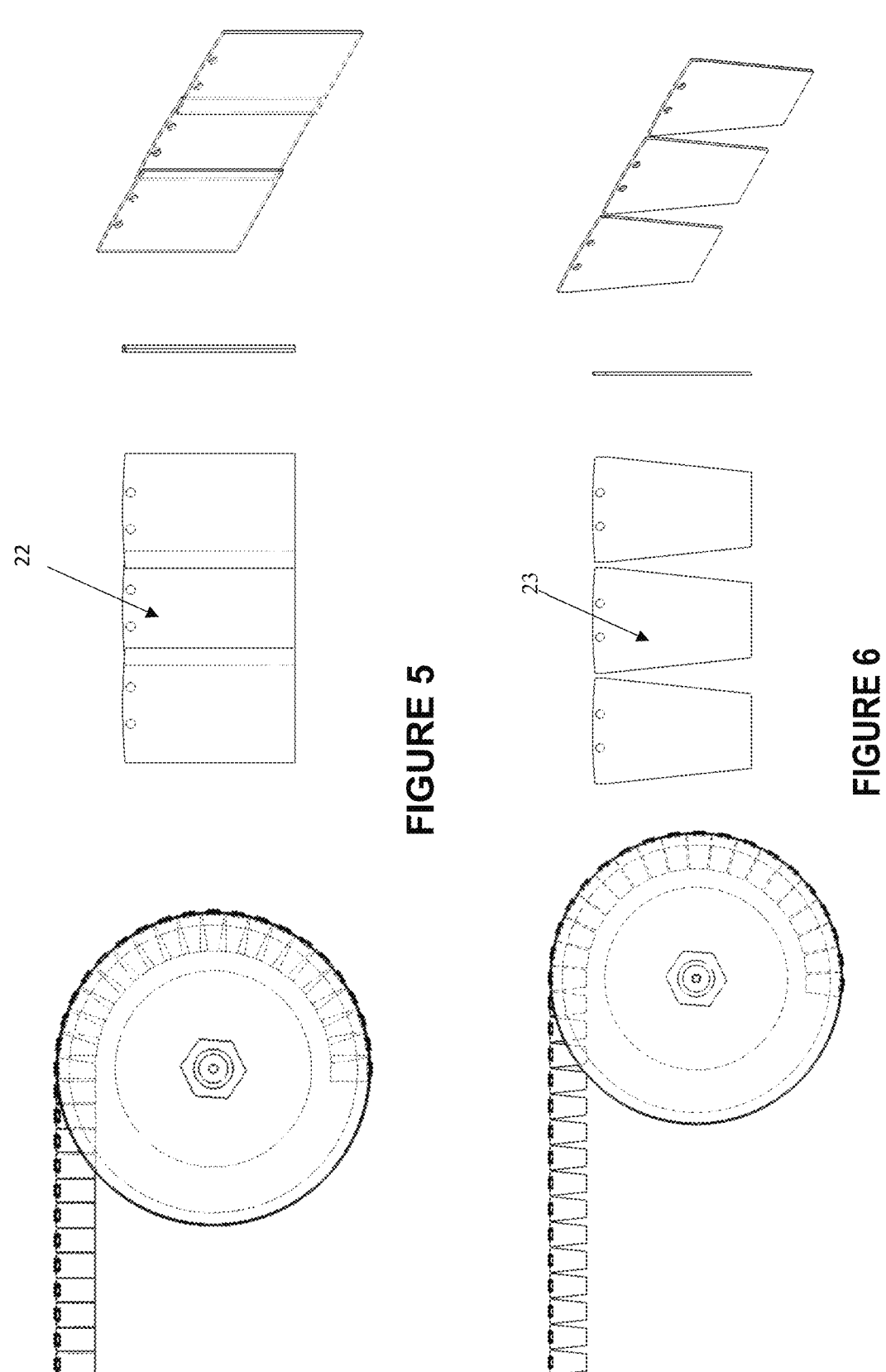

FIG. 1 shows an overview of the linear induction motor unit (18) of this invention, which has the parts called the secondary, copper windings (02) of the primary (14), lateral and upper protection rollers (03), secondary (1) fixing parts (04), secondary (01) bristle cleaner (05), deflector (06) for the secondary (01) plates, fixing shaft (07) of the primary (14) faces ((08a) and (08b), iron core (08) of the primary (14), protection boxes (09), heat sink (10), and motor base fixing structure (11);

FIG. 2 shows a side view of the motor with a cross-section AA where we observe that the primary (14) has two faces (08a) and (08b) on both sides of the secondary (01);

FIG. 3 illustrates a top view with the essential components of the motor in which it is possible to visualize the hatched cores of the primary faces (08a) and (08b), as well as the slots (13) in the primary iron core (14) where the copper windings (02) of the primary (14) are housed, and also the secondary (01) of the overlapped type (22) sectioned. In this view, it is possible to see the air gap between the secondary (01) and the faces (8a; 8b) of the primary (14), and the fixing holes (12) of the motor base structure;

FIG. 4 shows the linear drive being applied to a linear belt conveyor where the following can be seen: the conveyor belt canvas (15), the return drums of the loop (16), the return rollers (17), the linear motor (18) distributed along the conveyor, the return drum shaft (19), and the structure (20) of the load rollers (21) that support the belt (015) and the load rollers (21);

FIG. 5 shows the type of overlapped section secondary (22) where the plates form an overlapping and interleaved train to allow the blades to accommodate during the curve on the return drum (19). In this configuration, the secondary (01) has a thickness of 2 plates, as can be seen in the views drawn in this FIGURE;

FIG. 6 shows the type of trapezoidal section secondary (23) where there is no plate overlap, but rather a linear train of trapezoidal blades of the secondary (01). In this configu-ration, the secondary (01) has the thickness of a single plate.

DESCRIPTION OF THE INVENTION

The linear drive for continuous bulk material conveyors needed to be developed to solve the problem of conventional conveyors that use rotary drive motors on their head pulleys. Such a conventional solution requires high belt tension to prevent slippage on the drive drum. These high mechanical tensions result in various problems for the equipment's operation, causing wear, inefficiencies, and operational safety risks.

The invention shown here solves the problem of localized motorization and proposes the use of linear motor units (18) along the length of the conveyor belt to achieve the power required for the equipment's load transportation.

The proposed linear drive is based on linear induction electric motors, which, in this case, are arranged in the short double-faced primary (14) configuration in which two linear motor units (18) are positioned against each other (08a and 08b), leaving a free gap between them for the passage of the inducted element.

The primary (14) is the part of the electric motor that contains the winding of the phases in the form of coils that are installed in the slots (13) of its laminated iron core (08), forming the motor's poles.

The element undergoing induction generated by the field modulation in the windings of the primary (14) is called the secondary (01), and in this case, it must necessarily be constructed with conductive materials such as copper or aluminum.

The invention also proposes two options for this secondary (01), since, in the use in linear conveyors, the secondary (01) element must allow loop movement accommodating itself on the return drums located at the head of the conveyors during curves. Thus, the two options are:

An overlapped section secondary, where the sections are justified to facilitate the flexibility of the conveyor belt and it must be overlapped to allow continuity of the active area and perform curves on the drum without deforming, as illustrated in FIG. 5. With this overlap, the area seen by the primary (14) is constant and without gaps, thus achieving greater efficiency and smooth movement. A disadvantage of this configuration is that the total thickness of the secondary (01) is that of two plates, which increases the gap between the active faces (8a and 8b) of the primary (14) of the motor.

The second type is a trapezoidal section secondary, where the sections are justified by the flexibility of the conveyor belt (15) and have a trapezoidal shape to allow curves on the return drums, as shown in FIG. 6. Since there is no overlap of plates in this case, the thickness of the secondary (01) is the same as that of the plate used, allowing a shorter distance between the active faces (8a; 8b) of the primary (14). However, due to the trapezoidal shape of the plate, there is a loss of active area when the secondary (01) is in the region of the primary (14), causing lower efficiency and vibrations due to the variation between the upper and lower areas of the secondary blade.

The proposed invention stands out from others by the use of a double-faced induction motor with an aluminum secondary in the application of linear conveyors, where no compatible examples were found in the searches for prior art.

The activation and control of the motor units are carried out through frequency inverters that act on the current modulation in the coils of the primary (14), generating a traveling wave in the different motor poles. This traveling field in the gap region between the active faces (8a; 8b) of the primary (14) generates induced currents on the faces of the secondary (01) made of conductive material. The interaction between the fields generated by the currents of the primary (14) and the secondary (01) generates forces in the direction of movement of the plate train.

The use of several linear motor units (18), distributed along the length of the conveyor belt with synchronized drive, prevents slippage of the secondary (01), which is attached to the conveyor belt (15), and thus makes it unnecessary to use tensioners and high mechanical tension loads on the belt. This fact improves energy efficiency and reduces loads on support elements such as rollers (03) and bearings.

Another advantage of the invention is to increase the availability of conveyors because if there is a failure in any electric motor unit, its load can be redistributed to the other motors in operation. Thus, the defective unit can be replaced without shutting down the conveyor belt due to no mechanical contact between the parts.

The invention of this type of distributed drive with segmented secondary that allows accommodation on return drums also solves the problem of unidirectional movement existing in conventional conveyors with rotary motors. Such equipment, to generate movement in two directions, required a motor assembly on both drums of the conveyor and the need to reposition tensioners or tensioning devices for flexible belts so that the conveyors always operated in traction (pulling the belt). With the distributed linear drive proposed, conveyors can benefit from driving in both directions without the need for physical modifications to the equipment. This is because the tension in the belt is distributed, preventing the "wrinkling" of the belt.

Operation in the transport of granular loads such as stones, ores, sand, wood, or food requires special attention, as these materials can easily contaminate the elements of an electric motor. In the case of conventional motors, the penetration of dust or grains inside would be fatal to the motor. In the proposed invention, the linear induction motor tolerates the presence of dirt better due to the greater space between the secondary (01)_plates and the active face of the primary (14). Additionally, the invention features bristle cleaners (05) or scrapers to remove larger debris, deflectors (06) at the entry and exit of the primary (14) to direct the primary (14) plates and a protective box (09) to reduce the volume of contaminating material that may enter the primary (14). All this equipment is designed to facilitate the assembly and maintenance of the motor, and can be easily removed for cleaning.

Such linear drive applies to horizontal or vertical conveyors with flexible rubber-belt for the transport of granulated materials.

Deflectors (06) are strategically positioned elements to prevent misalignment of the secondary (01), ensuring that its plates will pass in the central region of the primary (14) without touching the inner faces. This device consists of two plates positioned bilaterally like a nozzle that directs the secondary (01) train into the primary (14) of the motor to centralize this element and prevent possible collisions. The deflector (06) material should not cause damage to the secondary plates and should be constructed to allow practical replacement when necessary.

Another alignment/protection device is the rollers (03) located on the top of the protective box (09). Their presence is necessary because the motor is positioned in the space between the rollers of the conveyor belts. In this region, there is the possibility of forming a "belly" or sag deformation of the conveyor belt (15) due to the action of the transported load. This catenary curve can cause the top of the secondary (01) to collide vertically with the body of the primary (14) or its protective box (09). These rollers (03) then prevent this collision and allow continuous movement of the belt (15) and secondary (01). The rollers should be constructed of materials that do not degrade the secondary, such as engineering plastics or composites, and equipped with bearings for rotation during contact.

The entire length of the internal faces of the primary (14) must be resin-coated with a fiberglass cover. This promotes protection against unwanted collisions, touches from the secondary (01), and also protects the motor from water, allowing it to operate in the open under rain.

Since the motor is continuously on for extended periods, it is equipped with finned aluminum heat sinks (10) promoting heat exchange by natural or forced convection depending on the ambient temperature of the operating location.

The fixation of each secondary (04) blade is done independently on the conveyor belt (15), allowing freedom for its elongation and not restricting the elastic behavior of the conveyor. In flexible belt conveyors, longitudinal elongation is normal due to operational loads and thermal expansion during operation. The train of secondary (01) plates of the motor is fixed directly to the body of the conveyor belt (15) through screws and cannot in any way prevent the expansion or elongation of the conveyor belt (15), as this would result in high mechanical tension on the motor secondary, leading to its breakage.

<div align="center">REFERENCE LIST</div>

01—Secondary;
02—Primary copper winding;
03—Side and upper protection rollers;
04—Secondary fixing piece;
05—Secondary bristle cleaner;
06—Deflector for secondary plates;
07—Faces fixing shaft;
08—Primary iron core;
8*a* and 8*b*—Primary faces;
09—Protection boxes;
10—Heat sink;
11—Motor base fixing structure;
12—Motor base fixing hole;
13—Primary core slots;
14—Primary;
15—Belt/Conveyor;
16—Loop return drums;
17—Return rollers;
18—Linear Motor Unit;
19—Return drum;
20—Load roller structure;
21—Load roller;
22—Overlapping segmented secondary;
23—Trapezoidal segmented secondary.

The invention claimed is:

1. A linear drive for continuous bulk material conveying device comprising:

a conveyor belt (15);

a plurality of linear induction electric motors (18) arranged along a length of the conveyor belt (15), the linear induction motors (18) are synchronized by a drive, the induction electric motors (18) having a short primary (14) having a first face (08*a*) and a second face (08*b*) located on opposite sides of the short primary (14) forming a gap for the passage of a long and segmented movable secondary, the short primary (14) including copper windings (02) in the form of coils installed in slots (13) of a laminated iron core (08) forming motor poles, the long and segmented movable secondary (01) including a plurality of blades forming a train of plates, the blades are made of a conductive material, the train of plates includes a rectangular shape overlapping blades (22) without a gap between adjacent blades (22) or trapezoidal shape blades (23) having a large base fixed on the conveyor (15) and a small base pointing to an inner part of the conveyor belt (15);

wherein the canvas of the conveyor belt (15) is made of rubber, having independent fastening elements (04) for each secondary blade (22; 23) fixed to the rubber conveyor belt (15);

wherein the short primary (14) includes deflectors (06) fixed integrally with a fixing shaft (07) of faces (08*a*; 08*b*) of the iron core (8);

an entire extension of an inner portion of the faces (8*a*; 8*b*) of the short primary (14) being resin-coated with a fiberglass covering;

the iron core (08) includes on each one of its outer faces finned aluminum heat sinks (10);

wherein the short primary (14) includes a protective box (09), wherein in an upper region of the protective box (9) includes upper rollers (03);

wherein the long and segmented movable secondary (01) includes a bristle cleaner (5).

\* \* \* \* \*